United States Patent
Iwasa (10) Patent No.: US 11,273,826 B2
(45) Date of Patent: Mar. 15, 2022

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventor: Tatsuya Iwasa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 228 days.

(21) Appl. No.: 16/478,872

(22) PCT Filed: Jan. 23, 2017

(86) PCT No.: PCT/JP2017/002103
§ 371 (c)(1),
(2) Date: Jul. 18, 2019

(87) PCT Pub. No.: WO2018/134994
PCT Pub. Date: Jul. 26, 2018

(65) Prior Publication Data
US 2019/0382009 A1 Dec. 19, 2019

(51) Int. Cl.
*B60W 30/14* (2006.01)
*B60W 30/182* (2020.01)
(Continued)

(52) U.S. Cl.
CPC ............ *B60W 30/14* (2013.01); *B60W 10/04* (2013.01); *B60W 10/18* (2013.01); *B60W 10/20* (2013.01);
(Continued)

(58) Field of Classification Search
CPC ...... B60W 30/14; B60W 10/04; B60W 10/18; B60W 10/20; B60W 30/182; B60W 50/10;
(Continued)

(56) References Cited

U.S. PATENT DOCUMENTS

| | | | | |
|---|---|---|---|---|
| 5,752,211 A | * | 5/1998 | Takasaki | B60K 23/0808 |
| | | | | 180/197 |
| 2011/0005212 A1 | * | 1/2011 | Matsushita | F02D 37/02 |
| | | | | 60/299 |

(Continued)

FOREIGN PATENT DOCUMENTS

| | | | | |
|---|---|---|---|---|
| CN | 102463992 A | * | 5/2012 | ............ B60W 30/02 |
| CN | 102481930 A | * | 5/2012 | ............ B60W 10/18 |

(Continued)

OTHER PUBLICATIONS

S. Brandenburg et al., "Switching from manual to automated driving and reverse: Are drivers behaving more risky after highly automated driving?," 2014, Publisher: IEEE.*

(Continued)

*Primary Examiner* — Tuan C To
(74) *Attorney, Agent, or Firm* — Amin, Turocy & Watson, LLP (57) ABSTRACT

A vehicle control system including: a driving operator on which an operation used for manual driving is performed by a vehicle occupant; an output device that outputs information; an automated driving controller that executes automated driving automatically controlling at least one of acceleration/deceleration and steering of a vehicle; and a switching controller that causes the output device to output request information for requesting an operation on the driving operator when automated driving using the automated driving controller ends and is switched to manual driving and sets a control gain for the operation performed on the driving operator to be lower in at least a predetermined period after causing the output device to output the request information to than in a period other than the predetermined period.

9 Claims, 7 Drawing Sheets

(51) Int. Cl.

| | |
|---|---|
| *B60W 50/14* | (2020.01) |
| *B60W 50/10* | (2012.01) |
| *B60W 50/12* | (2012.01) |
| *G01C 21/26* | (2006.01) |
| *G08G 1/0969* | (2006.01) |
| *B60W 10/18* | (2012.01) |
| *B60W 10/04* | (2006.01) |
| *B60W 10/20* | (2006.01) |
| *B60W 50/00* | (2006.01) |

(52) U.S. Cl.
CPC .......... *B60W 30/182* (2013.01); *B60W 50/10* (2013.01); *B60W 50/12* (2013.01); *B60W 50/14* (2013.01); *G01C 21/26* (2013.01); *G08G 1/0969* (2013.01); *B60W 2050/0096* (2013.01); *B60W 2050/146* (2013.01)

(58) Field of Classification Search
CPC ................ B60W 50/12; B60W 50/14; B60W 2050/0096; B60W 2050/146; G01C 21/26; G08G 1/0969
USPC .......................................................... 701/23
See application file for complete search history.

(56) References Cited

U.S. PATENT DOCUMENTS

| | | | | |
|---|---|---|---|---|
| 2016/0358479 | A1* | 12/2016 | Riedelsheimer | ..... G08G 1/0145 |
| 2017/0003683 | A1* | 1/2017 | Sato | ..... B62D 15/025 |
| 2017/0008522 | A1* | 1/2017 | Sato | ..... B60W 30/095 |
| 2017/0008557 | A1* | 1/2017 | Mitsumoto | ..... B62D 3/126 |
| 2017/0017233 | A1 | 1/2017 | Ichikawa et al. | |
| 2017/0144568 | A1* | 5/2017 | Torii | ..... B60N 2/767 |
| 2017/0225685 | A1* | 8/2017 | Aoki | ..... B60Q 1/40 |

FOREIGN PATENT DOCUMENTS

| | | | | |
|---|---|---|---|---|
| CN | 106256643 | | 12/2016 | |
| CN | 106428193 A | * | 2/2017 | .......... B62D 5/0463 |
| EP | 2495149 A2 | * | 9/2012 | .......... B60W 30/12 |
| JP | 3-282712 | | 12/1991 | |
| JP | 10-309961 | | 11/1998 | |
| JP | 10-329575 | | 12/1998 | |
| JP | 2014-106854 | | 6/2014 | |
| JP | 2015-182525 | | 10/2015 | |
| JP | 2016162299 A | * | 9/2016 | .......... G05D 1/0251 |
| WO | 2016/047063 | | 3/2016 | |
| WO | 2016/121710 | | 8/2016 | |
| WO | 2016/199379 | | 12/2016 | |

OTHER PUBLICATIONS

Erwin et al. "Towards Personalised Automated Driving: Prediction of Preferred ACC Behaviour based on Manual Driving," 2016, Publisher: IEEE.*

Arie et al., "The Influence of Time-criticality on Situation Awareness when Retrieving Human Control after Automated Driving," 2013, Publisher: IEEE.*

International Search Report and Written Opinion for International Application No. PCT/JP2017/002103 dated Apr. 18, 2017, 9 pgs.

Chinese Office Action for Chinese Patent Application No. 201780083827.5 dated Nov. 3, 2021.

* cited by examiner

| INTENSITY OF HANDOVER REQUEST | STRONG | WEAK |
|---|---|---|
| SPEAKER | MESSAGE HAVING LARGE VOLUME AND HIGH DEGREE OF EMERGENCY | MESSAGE HAVING SMALL VOLUME AND LOW DEGREE OF EMERGENCY |
| VIBRATOR | LARGE VIBRATION WIDTH AND HIGH FREQUENCY | SMALL VIBRATION WIDTH AND LOW FREQUENCY |
| DISPLAY DEVICE | BLINKING MESSAGE HAVING HIGH DEGREE OF EMERGENCY WITH COLOR HAVING STRONG STIMULUS | MESSAGE HAVING LOW DEGREE OF EMERGENCY WITH COLOR HAVING LOW STIMULUS |
| ... | ... | ... |

VEHICLE CONTROL SYSTEM, VEHICLE CONTROL METHOD, AND STORAGE MEDIUM

TECHNICAL FIELD

The present invention relates to a vehicle control system, a vehicle control method, and a storage medium.

BACKGROUND ART

In recent years, research has been conducted on automated driving automatically performing acceleration/deceleration and steering. In relation to this, technologies (see Patent Literature 1) for giving a notification for prompting a driver to release automated driving in a case in which it is determined by a determination means that conditions for performing automated driving are not satisfied during automated driving have been disclosed.

CITATION LIST

Patent Literature

[Patent Literature 1] Japanese Unexamined Patent Application, First Publication No. 2014-106854

SUMMARY OF INVENTION

Technical Problem

It is conceivable that a notification may be performed, as in Patent Literature described above, when switching from automated driving to manual driving is performed. Although various reasons for the switching may be conceived, in a case in which switching from automated driving to manual driving is performed due to an unexpected reason, a case in which a driving operator is excessively operated due to the vehicle occupant not being mentally ready may be assumed.

The present invention is realized in consideration of such situations, and one objective thereof is to provide a vehicle control system, a vehicle control method, and a vehicle control program capable of inhibiting occurrence of an inappropriate behavior in a vehicle according to an excessive operation when switching from automated driving to manual driving is performed.

Solution to Problem

A vehicle control device, a vehicle control method, and a storage medium according to the present invention employ the following configurations.

(1): According to one aspect of the present invention, there is provided a vehicle control system including: a driving operator on which an operation used for manual driving is performed by a vehicle occupant; an output device configured to output information; an automated driving controller configured to execute automated driving automatically controlling at least one of acceleration/deceleration and steering of a vehicle; and a switching controller configured to cause the output device to output request information for requesting an operation on the driving operator when automated driving using the automated driving controller ends and is switched to manual driving and sets a control gain for the operation performed on the driving operator to be lower in at least a predetermined period after causing the output device to output the request information than in a period other than the predetermined period.

(2): In the aspect (1) described above, the switching controller is configured to change an output form of the request information from the output device on the basis of a cause that is a reason for ending automated driving by the automated driving controller and switching over to the manual driving and changes a degree of lowering the control gain in the predetermined period on the basis of the cause or the output form of the request information.

(3): In the aspect (1) described above, the switching controller is configured to set the control gain in the predetermined period to be the same as the control gain in a period other than the predetermined period when the automated driving by the automated driving controller ends according to a specific reason and is switched to the manual driving.

(4): In the aspect (1) described above, the switching controller is configured to, in the predetermined period, set the control gain in a case in which an operation amount on the driving operator is equal to or smaller than a predetermined operation amount to be lower than a control gain in a case in which the operation amount on the driving operator exceeds the predetermined operation amount.

(5): In the aspect (1) described above, the switching controller is configured to, after causing the output device to output the request information, gradually increase the control gain for the operation performed on the driving operator in accordance with elapse of time.

(6): In the aspect (1) described above, further including a detector configured to detect a state of a vehicle occupant, wherein the switching controller is configured to set the predetermined period to be variable on the basis of the state of the vehicle occupant that is detected by the detector.

(7): In the aspect (1) described above, the switching controller is configured to set the control gain relating to braking in the predetermined period to be the same as a control gain relating to braking in a period other than the predetermined period.

(8): According to another aspect of the present invention, there is provided a vehicle control method using a control computer of a vehicle including a driving operator on which an operation used for manual driving is performed by a vehicle occupant and an output device that outputs information, the vehicle control method including: executing automated driving automatically controlling at least one of acceleration/deceleration and steering of the vehicle; and causing the output device to output request information for requesting an operation on the driving operator when the automated driving ends and is switched to the manual driving and setting a control gain for the operation performed on the driving operator to be lower in at least a predetermined period after causing the output device output the request information to the output device than in a period other than the predetermined period.

(9): According to another aspect of the present invention, there is provided a computer-readable non-transitory storage medium storing a vehicle control program, the vehicle control program causing a control computer of a vehicle including a driving operator on which an operation used for manual driving is performed by a vehicle occupant and an output device that outputs information to perform: executing automated driving automatically controlling at least one of acceleration/deceleration and steering of the vehicle; and causing the output device to output request information for requesting an operation on the driving operator when the automated driving ends and is switched to the manual driving and setting a control gain for the operation performed on the driving operator to be lower in at least a predetermined period after causing the output device to output the request information than in a period other than the predetermined period.

Advantageous Effects of Invention

According to the (1), (5), (8), and (9) described above, when switching from automated driving to manual driving is performed, occurrence of an inappropriate behavior in the vehicle according to an excessive operation can be inhibited.

According to (2) described above, a control gain can be more actively decreased in a view in which an unintentional operation may easily occur.

According to (3) described above, particularly, in a case in which there is a specific reason for requiring an emergent operation, by setting the control gain to be the same as that of a normal time, an avoiding behavior using manual driving can be quickly enabled.

According to (4) described above, by decreasing the control gain for a s particularly harp and small operation, the influence of an unintentional operation can be appropriately reduced.

According to (6) described above, in a case in which a driver is in a desirable state prepared for manual driving, the control gain quickly approaches that of a normal time, and the responsiveness can be improved.

According to (7) described above, an operation of avoiding an obstacle through sudden braking can be prioritized.

DESCRIPTION OF EMBODIMENTS

Hereinafter, a vehicle control system, a vehicle control method, and a vehicle control program according to embodiments of the present invention will be described with reference to the drawings.

Figure 1:
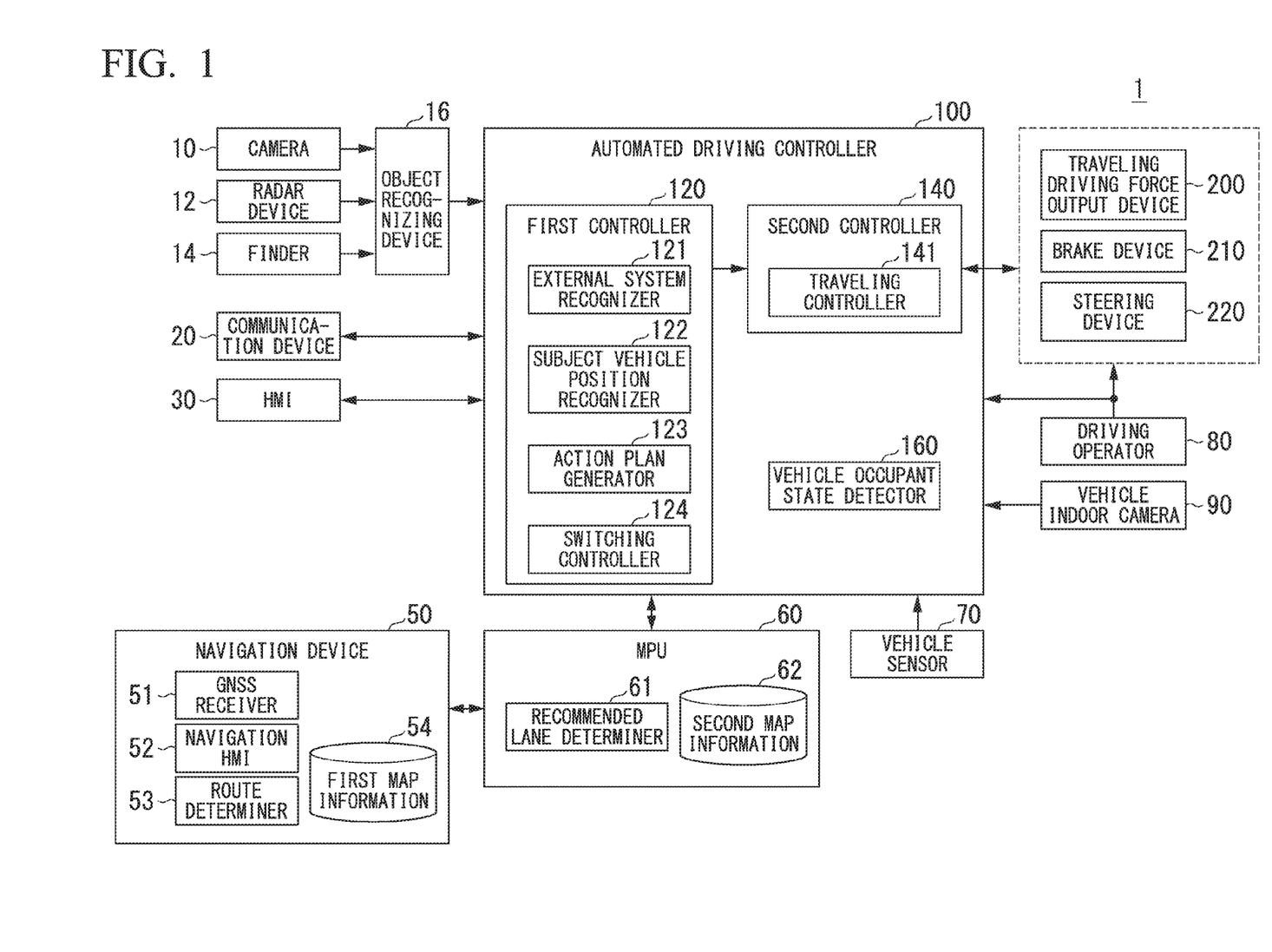
FIG. 1 is a diagram illustrating one example of the configuration of a vehicle system 1.

FIG. 1 is a diagram illustrating one example of the configuration of a vehicle system 1. In the vehicle system 1, for example, a camera 10, a radar device 12, a finder 14, an object recognizing device 16, a communication device 20, a human machine interface (HMI) 30, a navigation device 50, a micro-processing unit (MPU) 60, a vehicle sensor 70, a driving operator 80, a vehicle indoor camera 90, an automated driving controller 100, a traveling driving force output device 200, a brake device 210, and a steering device 220 are mounted. Such devices and units are interconnected using a multiplex communication line such as a controller area network (CAN) communication line, a serial communication line, a radio communication network, or the like. In addition, the configuration illustrated in FIG. 1 is merely one example, and thus, some components may be omitted, and, furthermore, another component may be added thereto.

In addition, among the components illustrated in FIG. 1, for example, an external system recognizer 121, a subject vehicle position recognizer 122, an action plan generator 123, and a traveling controller 141 correspond to an "automated driving controller", and the HMI 30, the driving operator 80, a switching controller 124, and a vehicle occupant state detector 160 added thereto correspond to a "vehicle control system".

The camera 10, for example, is a digital camera using a solid-state imaging device such as a charge coupled device (CCD) or a complementary metal oxide semiconductor (CMOS). One or a plurality of cameras 10 are installed at arbitrary places in a vehicle M. In a case in which the side in front is to be imaged, the camera 10 is installed at an upper part of a front windshield, a rear face of a rear-view mirror, or the like. The camera 10, for example, repeatedly images the vicinity of the vehicle M periodically. The camera 10 may be a stereo camera.

The radar device 12 emits radiowaves such as millimeter waves to the vicinity of the vehicle M and detects at least a position (a distance and an azimuth) of an object by detecting radiowaves (reflected waves) reflected by the object. One or a plurality of radar devices 12 are installed at arbitrary places in the vehicle M. The radar device 12 may detect a position and a speed of an object using a frequency modulated continuous wave (FM-CW) system.

The finder 14 is a light detection and ranging or a laser imaging detection and ranging (LIDAR) finder that detects a distance to a target by measuring light scattered from emitted light. One or a plurality of finders 14 are installed at arbitrary places in the vehicle M.

The object recognizing device 16 may perform a sensor fusion process on results of detection using some or all of the camera 10, the radar device 12, and the finder 14, thereby recognizing a position, a type, a speed, and the like of an object. The object recognizing device 16 outputs a result of recognition to the automated driving controller 100.

The communication device 20, for example, communicates with other vehicles present in the vicinity of the vehicle M using a cellular network, a Wi-Fi network, Bluetooth (registered trademark), dedicated short range communication (DSRC), or the like or communicates with various server apparatuses through a radio base station.

The HMI 30 presents various types of information to a vehicle occupant of the vehicle M and accepts an input operation performed by a vehicle occupant. The HMI 30, for example, includes various display devices, a speaker, a buzzer, a touch panel, a switch, a key, a sheet, a vibrator installed on a steering wheel, and the like.

The navigation device 50, for example, includes a global navigation satellite system (GNSS) receiver 51, a navigation HMI 52, and a route determiner 53 and stores first map information 54 in a storage device such as a hard disk drive (HDD) or a flash memory. The GNSS receiver identifies a position of the vehicle M on the basis of signals received from GNSS satellites. The position of the vehicle M may be identified or complemented by an inertial navigation system (INS) using an output of the vehicle sensor 70. The navigation HMI 52 includes a display device, a speaker, a touch panel, a key, and the like. A part or the whole of the navigation HMI 52 and the HMI 30 described above may be configured to be shared. The route determiner 53, for example, determines a route from a position of the vehicle M identified by the GNSS receiver 51 (or an input arbitrary position) to a destination input by a vehicle occupant using the navigation HMI 52 by referring to the first map information 54. The first map information 54, for example, is information in which a road form is represented by respective links representing a road and respective nodes connected using the links.

The first map information 54 may include a curvature of each road, point of interest (POI) information, and the like. The route determined by the route determiner 53 is output to the MPU 60. In addition, the navigation device 50 may perform route guidance using the navigation HMI 52 on the basis of the route determined by the route determiner 53. Furthermore, the navigation device 50, for example, may be realized by a function of a terminal device such as a smartphone or a tablet terminal carried by a user. In addition, the navigation device 50 may transmit a current position and a destination to a navigation server through the communication device 20 and acquire a route received from the navigation server as a reply.

The MPU 60, for example, functions as a recommended lane determiner 61 and maintains second map information 62 in a storage device such as an HDD or a flash memory. The recommended lane determiner 61 divides a route provided from the navigation device 50 into a plurality of blocks (for example, divides the route into blocks of 100*m* in the advancement direction of the vehicle) and determines a recommended lane for each block by referring to the second map information 62. The recommended lane determiner 61 determines which lane to run from the left side. In a case in which a branching place, a merging place, or the like is present in the route, the recommended lane determiner 61 determines a recommended lane such that the vehicle M can run on a reasonable route for advancement to divergent destinations.

The second map information 62 is map information having an accuracy higher than that of the first map information 54. The second map information 62, for example, includes information of the center of respective lanes, information on boundaries between lanes, or the like. In addition, in the second map information 62, road information, traffic regulations information, address information (address and zip code), facilities information, telephone information, and the like may be included. In the road information, information representing a type of road such as an expressway, a toll road, a national highway, or a prefectural road and information such as the number of lanes of a road, a width of each lane, a gradient of a road, a position of a road (three-dimensional coordinates including longitude, latitude, and a height), a curvature of the curve of a lane, positions of merging and branching points of lanes, a sign installed on a road, and the like are included. The second map information 62 may be updated as is necessary by accessing another device using the communication device 20.

The vehicle sensor 70 includes a vehicle speed sensor detecting a speed of the vehicle M, an acceleration sensor detecting an acceleration, a yaw rate sensor detecting an angular velocity around a vertical axis, an azimuth sensor detecting the azimuth of the vehicle M, and the like.

The driving operator 80, for example, includes an acceleration pedal, a brake pedal, a shift lever, a steering wheel, and other operators. A sensor detecting the amount of an operation or the presence/absence of an operation is installed in the driving operator 80, and a result of detection acquired by the sensor described above is output to one or both of the automated driving controller 100 and the traveling driving force output device 200, the brake device 210, or the steering device 220.

The vehicle indoor camera 90 images an upper body half by focusing on the face of a vehicle occupant sitting on a driver seat. An image captured by the vehicle indoor camera 90 is output to the automated driving controller 100.

The automated driving controller 100, for example, includes a first controller 120, a second controller 140, and a vehicle occupant state detector 160. Each of the first controller 120, the second controller 140, and the vehicle occupant state detector 160 is realized by a processor such as a central processing unit (CPU) executing a program (software). In addition, some or all of the functional units of the first controller 120, the second controller 140, and the vehicle occupant state detector 160 may be realized by hardware such as a large scale integration (LSI), an application specific integrated circuit (ASIC), a field-programmable gate array (FPGA), or the like or may be realized by cooperation between software and hardware.

The first controller 120, for example, includes an external system recognizer 121, a subject vehicle position recognizer 122, an action plan generator 123, and a switching controller 124.

The external system recognizer 121 recognizes states of surrounding vehicles such as positions, speeds, and accelerations on the basis of information input from the camera 10, the radar 12, and the finder 14 directly or through the object recognizing device 16. The position of a surrounding vehicle may be represented as a representative point such as the center of gravity, a corner, or the like of the surrounding vehicle and may be represented by an area represented by the contour of the surrounding vehicle. The "state" of a surrounding vehicle may include an acceleration or a jerk or may be an "action state" (for example, the vehicle is changing lanes or is to change lanes) of the surrounding vehicle. In addition, the external system recognizer 121 may recognize positions of a guard rail and electric posts, a parked vehicle, a pedestrian, and other objects in addition to the surrounding vehicles.

The subject vehicle position recognizer 122, for example, recognizes a lane (traveling lane) in which the vehicle M runs and a relative position and a posture of the vehicle M with respect to the traveling lane. The subject vehicle position recognizer 122 recognizes a traveling lane, for example, by comparing a pattern (for example, an array of solid lines and broken lines) of a road partition line that is acquired from the second map information 62 with a pattern of the road partition line in the vicinity of the vehicle M that is recognized from an image captured by the camera 10. In the recognition, the position of the vehicle M acquired from the navigation device 50 and a processing result acquired using the INS may be additionally taken into account.

Figure 2:
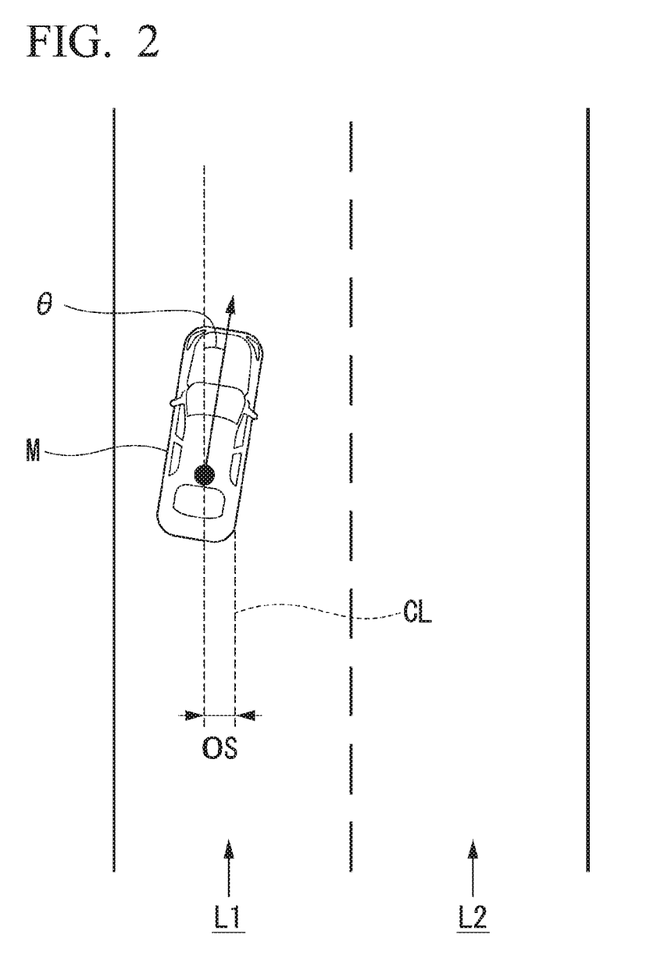
FIG. 2 is a diagram illustrating a view in which a relative position and a relative posture of a vehicle M with respect to a traveling lane L1 are recognized by a subject vehicle position recognizer.

Then, the subject vehicle position recognizer 122, for example, recognizes a position and a posture of the vehicle M with respect to the traveling lane. FIG. 2 is a diagram illustrating a view in which a relative position and a posture of a vehicle M with respect to a traveling lane L1 are recognized by the subject vehicle position recognizer 122.

The subject vehicle position recognizer 122, for example, recognizes an offset OS of a reference point (for example, center of gravity) of the vehicle M from traveling lane center CL and an angle θ of an advancement direction of the vehicle M formed with respect to a line acquired by aligning the traveling lane center CL as a relative position and a posture of the vehicle M with respect to the traveling lane L1. In addition, instead of this, the subject vehicle position recognizer 122 may recognize a position of the reference point of the vehicle M with respect to any one side end of the traveling lane L1 or the like as a relative position of the vehicle M with respect to the traveling lane. The relative position of the vehicle M recognized by the subject vehicle position recognizer 122 is provided for the recommended lane determiner 61 and the action plan generator 123.

The action plan generator 123 determines events to be sequentially executed in automated driving such that the vehicle M runs in a recommended lane determined by the recommended lane determiner 61, and the action plan generator 123 deals with a surrounding status of the vehicle M. As the events, for example, there are a constant-speed traveling event in which the vehicle runs at a constant speed in the same traveling lane, a following traveling event in which the vehicle follows a vehicle traveling ahead, a lane changing event, a merging event, a branching event, an emergency stop event, a handover event for ending automated driving and switching to manual driving, and the like. In addition, during the execution of such an event, there are also cases in which an action for avoidance is planned on the basis of surrounding statuses of the vehicle M (the presence/absence of surrounding vehicles and pedestrians, lane contraction according to road construction, and the like).

The action plan generator 123 generates a target trajectory in which the vehicle M will run in the future. The target trajectory, for example, includes a speed element. For example, a target trajectory is generated by setting a plurality of reference times in the future for every predetermined sampling time (for example, a fraction of a [sec]) as a set of target points (trajectory points) to be reached at such reference times. For this reason, a case in which a gap between trajectory points is large represents that the vehicle runs at a high speed in a section between the trajectory points.

Figure 3:
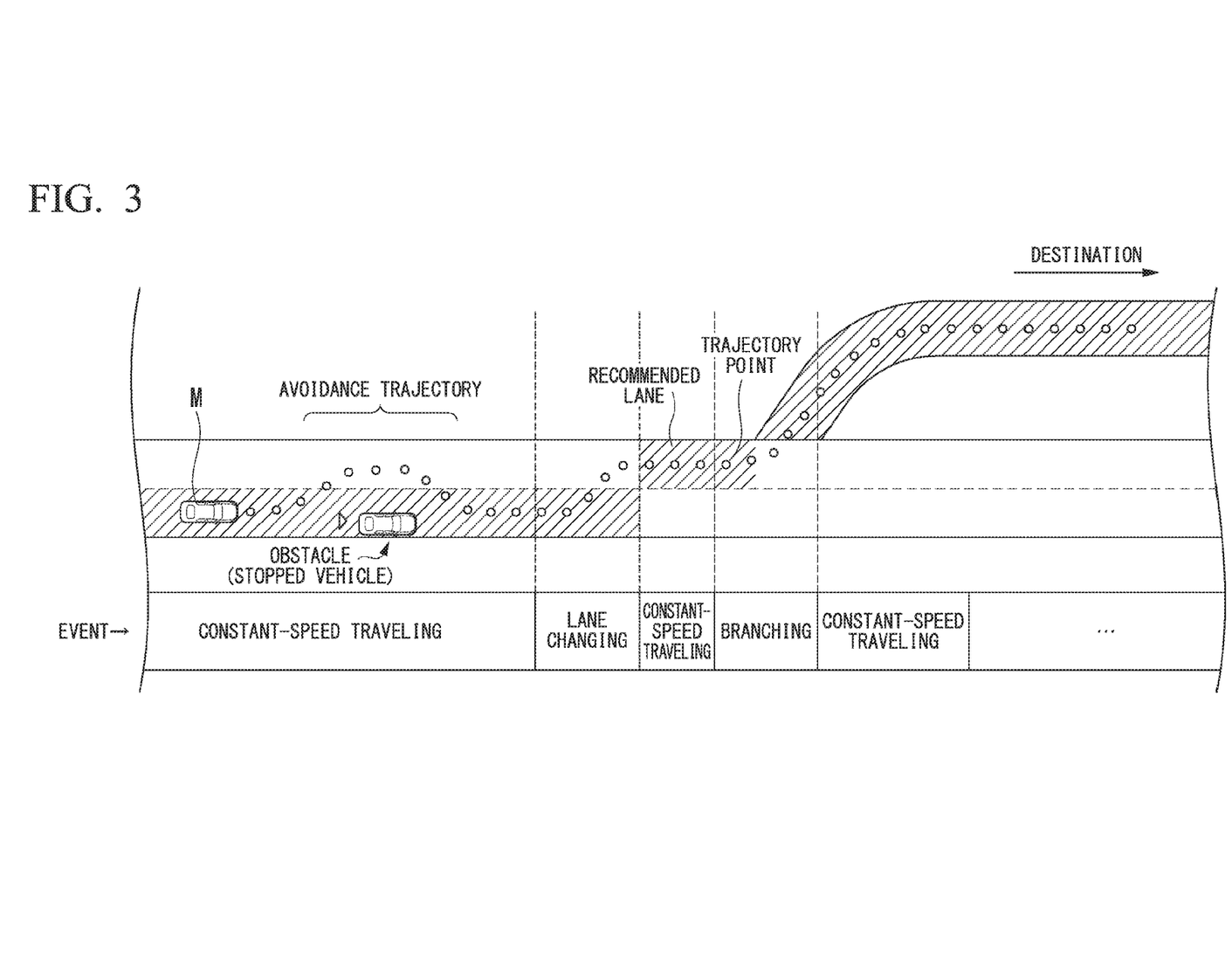
FIG. 3 is a diagram illustrating a view in which a target trajectory is generated on the basis of a recommended lane.

FIG. 3 is a diagram illustrating a view in which a target trajectory is generated on the basis of a recommended lane. As illustrated in the drawing, the recommended lane is set such that it is convenient for the vehicle to run along a route to a destination. When the vehicle reaches a point before a predetermined distance from a recommended lane switching place (may be determined in accordance with a type of event), the action plan generator 123 starts the lane changing event, the branching event, the merging event, or the like. In a case in which there is a need for avoiding an obstacle during the execution of each event, as illustrated in the drawing, an avoidance trajectory is generated.

The action plan generator 123, for example, generates a plurality of candidates for a target trajectory and selects an optimal target trajectory at that time point on the basis of the viewpoints of safety and efficiency.

The function of the switching controller 124 will be described later.

The second controller 140 includes a traveling controller 141. The traveling controller 141 controls the traveling driving force output device 200, the brake device 210, and the steering device 220 such that the vehicle M passes through the target trajectory generated by the action plan generator 123 at scheduled times.

The vehicle occupant state detector 160 detects a state of a vehicle occupant (driver) sitting on the driver seat. The state of a driver, for example, is perceived by analyzing an image captured by the vehicle indoor camera 90. The vehicle occupant state detector 160, for example, outputs an index acquired by digitalizing a degree of driver's eyes not being closed (a degree of awakening), a degree of the direction of a line of sight, which is perceived from relative positions of irises, the entire eyes, and the like, not being directed in front of the vehicle M (a degree of concentration), and other degrees on the basis of the state of a driver. In addition, a determination technique for perceiving the state of a driver may be arbitrarily set, and the vehicle occupant state detector 160, for example, may perceive the state of a driver by measuring a heart rate using an electrode mounted on a steering wheel or may perceive the state of a driver using a near infra-red spectroscopy (NIRS) sensor, a seating weight sensor, or the like.

The traveling driving force output device 200 outputs a traveling driving force (torque) for allowing a vehicle to run to driving wheels. The traveling driving force output device 200, for example, includes a combination of an internal combustion engine, an electric motor, a transmission gear, and the like and an ECU controlling such components. The ECU controls the components described above on the basis of information input from the automated driving controller 100 or information input from the driving operator 80.

The brake device 210, for example, includes a brake caliper, a cylinder delivering hydraulic pressure to the brake caliper, an electric motor generating hydraulic pressure in the cylinder, and a brake ECU. The brake ECU controls the electric motor on the basis of the information input from the automated driving controller 100 or the information input from the driving operator 80 such that a brake torque corresponding to a braking operation is output to each vehicle wheel. The brake device 210 may include a mechanism that delivers a hydraulic pressure generated in accordance with an operation for a brake pedal included in the driving operator 80 to the cylinder through a master cylinder as a backup. In addition, the brake device 210 is not limited to the configuration described above and may be an electronic control-type hydraulic brake device that delivers a hydraulic pressure of the master cylinder to the cylinder by controlling an actuator on the basis of information input from the traveling controller 141.

The steering device 220, for example, includes a steering ECU and an electric motor. The electric motor, for example, changes the direction of the steering wheel by applying a force to a rack and pinion mechanism. The steering ECU changes the direction of the steering wheel by driving the electric motor in accordance with information input from the automated driving controller 100 or information input from the driving operator 80.

[Switching Control]

Hereinafter, the function of the switching controller 124 will be described. The switching controller 124 starts to operate when a handover event for ending automated driving and switching to manual driving is started by the action plan generator 123. The action plan generator 123 starts a handover event in a case in which the following conditions are satisfied. For example, a handover event may be started in a case in which any one of conditions illustrated below is satisfied.

(1) The vehicle M has arrived in the vicinity of a destination set in advance.

(2) The surrounding environment of the vehicle M is an environment in which it is difficult to continue automated driving.

(3) An abnormality has occurred in the system for automated driving.

(4) An operation of a predetermined amount or more has been performed on the driving operator 80 (override).

In a view in which the condition (4) among the conditions described above is satisfied, it is presumed that a driver has intentionally tried to switch to manual driving. However, in a view in which any one of the conditions (1) to (3) is satisfied, automated driving is stopped from the vehicle M side, and accordingly, there is a probability that the driver will not be ready for manual driving.

Thus, in a case in which one of the conditions (1) to (3) is satisfied, the switching controller 124 causes the HMI 30 to output information (a handover request) requesting an operation of the driving operator 80 and, in a case in which an operation of a predetermined amount or more is performed on the driving operator 80, ends the automated driving and switches over to manual driving. In addition, also in a case in which the condition (4) is satisfied, switching over to manual driving may be notified using the HMI 30 or the like. Here, an operation of a predetermined amount or more, for example, regarding an acceleration pedal, is an operation causing a state in which a degree of acceleration opening is equal to or higher than a threshold to continue for a predetermined time or more.

In addition, the switching controller 124 sets a control gain of some or all of the traveling driving force output device 200, the brake device 210, and the steering device 220 (hereinafter, collectively referred to as driving devices) for an operation on the driving operator 80 to be lower during a predetermined period after output of the handover request than during a period other than the predetermined period.

This operation of adjusting this control gain, for example, may be performed by transmitting an instruction signal for lowering the gain from the switching controller 124 to the driving device or may be performed by transmitting a signal input from a sensor mounted in the driving operator 80 to the driving device with the value thereof being decreased by the switching controller 124. In addition, the traveling controller 141 may generate a control signal used for pseudo automated driving based on a signal input from a sensor mounted in the driving operator 80 in accordance with an instruction from the switching controller 124 and output the generated control signal to the driving device.

Figure 4:
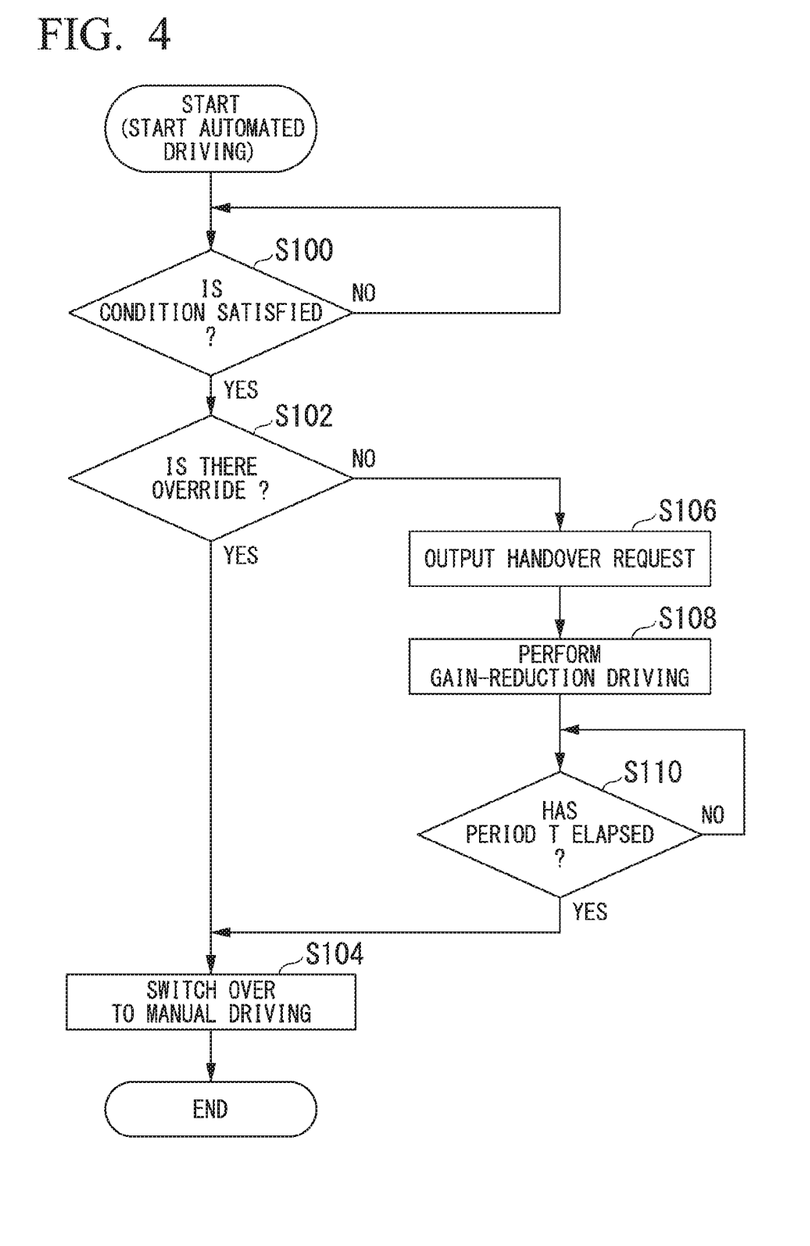
FIG. 4 is a flowchart partly illustrating a process executed by an automated driving controller.

FIG. 4 is a flowchart illustrating a part of a process executed by the automated driving controller 100. The process of this flowchart starts when automated driving is started.

First, the action plan generator 123 stands by until a condition for starting a handover event is satisfied (Step S100). When a first condition is satisfied, the switching controller 124 determines whether the condition has been satisfied in accordance with an override (Step S102). In a case in which the condition has been satisfied in accordance with an override, the switching controller 124 switches over to manual driving (Step S104).

On the other hand, in a case in which the condition has not been satisfied in accordance with an override, the switching controller 124 causes HMI 30 to output a handover request (Step S106). At this time, the switching controller 124 changes the intensity of the handover request in accordance with a reason for the satisfaction of the condition for starting a handover event. For example, the switching controller 124 performs control of the HMI 30 such that it outputs a handover request that is relatively weak in the case of the condition (1) described above and outputs a handover request that is relatively strong in the case of the condition (2) or (3).

Figure 5:
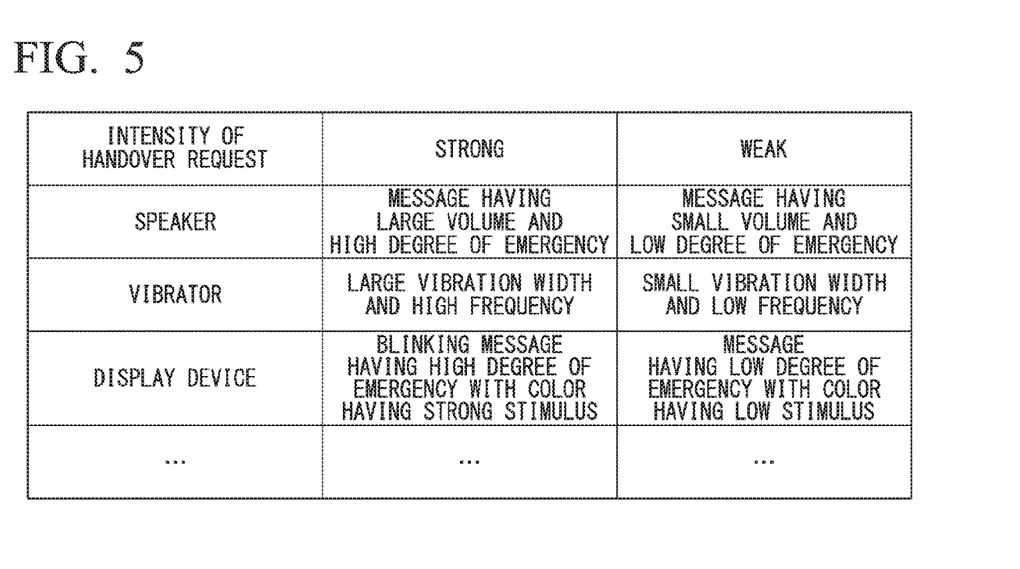
FIG. 5 is a diagram illustrating one example of a relation between an intensity of a handover request and a control state of an HMI.

FIG. 5 is a diagram illustrating one example of a relation between the intensity of a handover request and a control state of the HMI 30. In a case in which a strong handover request is output, a speaker outputs a message having a high level of emergency with a large volume (for example, "Automated driving cannot be continued. Please perform manual driving immediately."). In addition, the vibrator vibrates with a large vibration width at a high frequency, and the display device outputs a message having a high degree of emergency with a color and contrast having a strong stimulus (for example, red, blue, yellow, or the like) while blinking an image.

On the other hand, in a case in which a weak handover request is output, the speaker outputs a message having a low degree of emergency with a small volume (for example, "After this, driving will transition to manual driving".). In addition, the vibrator vibrates with a small vibration width at a low frequency, and the display device outputs a message having a low degree of emergency with a color and contrast having a low stimulus (for example, an intermediate color or the like). In addition, the intensity of the handover request is not limited to two levels and thus may be changed over three or more levels.

Referring back to FIG. 4, after outputting the handover request in Step S106, the switching controller 124 performs gain-reduction driving for reducing a control gain for the operation amount on the driving operator 80 (Step S108).

Figure 6:
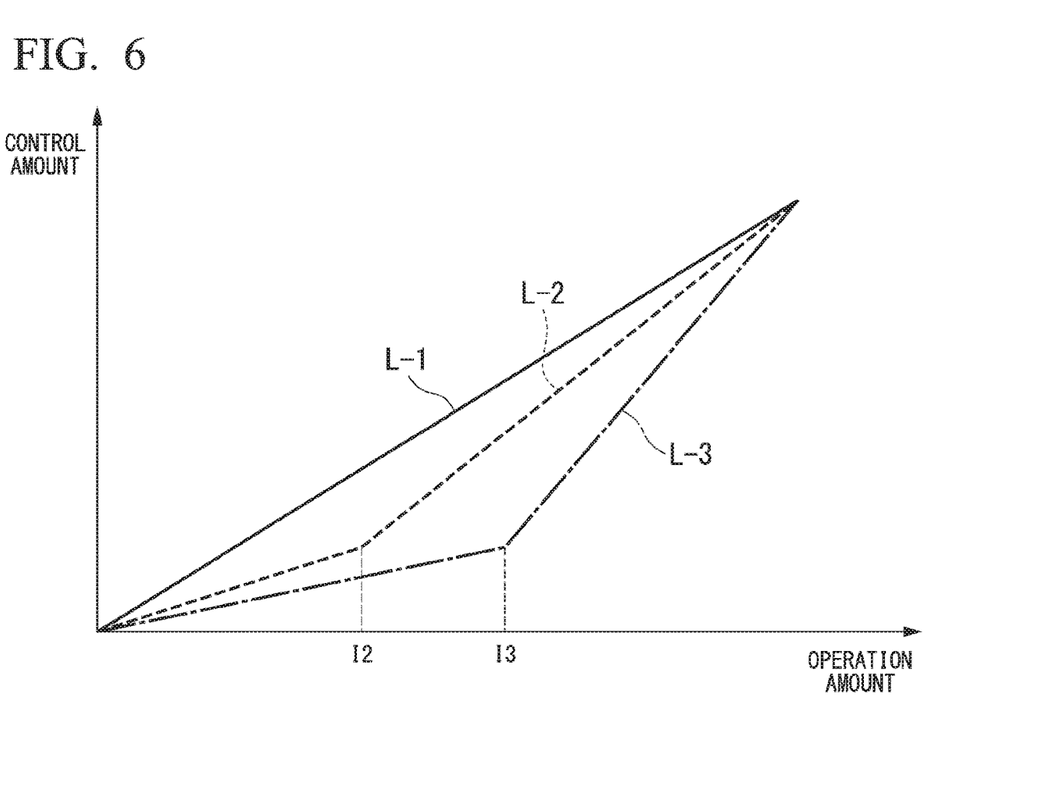
FIG. 6 is a diagram conceptually illustrating a relation between an operation amount of a driving operator and amounts of control of corresponding devices in gain-reduction driving.

FIG. 6 is a diagram conceptually illustrating a relation between the operation amount for the driving operator 80 and the amounts of control of corresponding devices in gain-reduction driving. The amounts of control of corresponding devices, for example, are a degree of opening of a throttle or a conduction current flowing in a motor with respect to the operation amount of an acceleration pedal (a degree of acceleration opening), a brake torque with respect to the operation amount of the brake pedal, a conduction current flowing in an electric motor with respect to the operation amount of the steering wheel, and the like. In the drawing, although each control line is represented as a straight line, the control line may be a curved line or have discrete values.

In the drawing, slopes of control lines L-1 to L-3 correspond to control gains. The control line L-1 illustrates a relation between the operation amount and the control amount in a period other than a predetermined period (hereinafter, referred to as a normal time). In contrast to this, the control line L-2 illustrates a relation between the operation amount and the control amount in a predetermined period after output of a weak handover request. In addition, the control line L-3 illustrates a relation between the operation amount and the control amount in a predetermined period after output of a strong handover request.

As illustrated in the drawing, the control line L-2 is acquired by setting the control gain to be lower than that of the control line L-1, and the control line L-3 is acquired by setting the control gain to be lower than that of the control line L-2. During execution of automated driving, there are cases in which a driver is sitting on a seat with hands off the steering wheel or a leg away from a pedal. From this state, when such a driving operator 80 is to be operated in response to a handover request, there are cases in which an unintentional sudden force may be applied, and the operation amount becomes large. Such a tendency is assumed to become strong in a case in which a strong handover request is output.

Accordingly, the switching controller 124 sets a control gain to be lower in a predetermined period after outputting a handover request than at a normal time and further lowers the control gain in a case in which a strong handover request is output. In this way, in a case in which an excessive operation is performed when switching from automated driving to manual driving is performed, occurrence of an inappropriate behavior in the vehicle M can be inhibited. In addition, the brake device 210 may be excluded from a target for which a control gain is lowered. The reason for this is that an operation of avoiding an obstacle by sudden braking is prioritized.

In addition, as illustrated in FIG. 6, a control gain in the case of a predetermined operation amount (I2 in the case of a weak handover, and I3 in the case of a strong handover) or less is set to be lower than that in the case of the predetermined operation amount or more. This reason for this is that there is a high probability that an unintentional operation generated in response to a handover request appears as a sharp and small operation amount. On the other hand, in a case in which the operation amount is equal to or larger than a predetermined operation amount, in accordance with an increase in the operation amount, the amount of decrease in the control gain decreases, and the control line approaches the control line L-1 at a normal time. This is based on that there is a high probability that a driver intentionally performs a large operation in a case in which the operation amount is large.

In the example illustrated in FIG. 6, although a control gain of the control line L-3 is lower than the control gain of the control line L-2 in an approximately entire control area, the configuration is not limited thereto. For example, the control gains of the control line L-3 and the control line L-2 may be configured to be the same (in other words, the control lines L-3 and L-2 overlap each other) in a control area in which the operation amount is smaller than a reference amount.

On the contrary, the control gains of the control line L-3 and the control line L-2 may be configured to be the same in a control area in which the operation amount is larger than a reference amount. In other words, the control gain of the control line L-3 may be set to be lower than the control gain of the control line L-2 at least in a case in which the operation amount is within a specified range.

Figure 7:
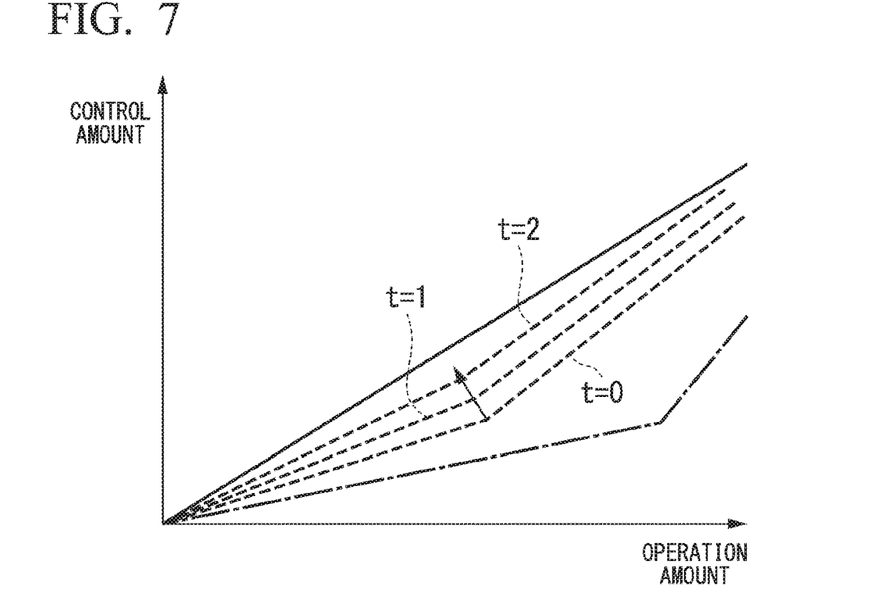
FIG. 7 is an example illustrating a view in which the amount of decrease in a control gain is adjusted such that it gradually decreases in accordance with elapse of a time.

In addition, the amount of decrease in the control gain may be adjusted such that it gradually decreases in accordance with elapse of time during a predetermined period. FIG. 7 is an example illustrating a view in which the amount of decrease in the control gain is adjusted such that it gradually decreases in accordance with elapse of time. Although changes only in the control line L-2 are illustrated in FIG. 7, this may similarly apply also to the control line L-3.

Referring back to FIG. 4, the switching controller 124 continues gain-reduction driving until a predetermined period T elapses (Step S110). The predetermined period T may be a constant time or may be variably controlled on the basis of the state of the driver. When the predetermined period T elapses, the switching controller 124 performs switching to manual driving (Step S104), and the process of this flowchart ends.

Figure 8:
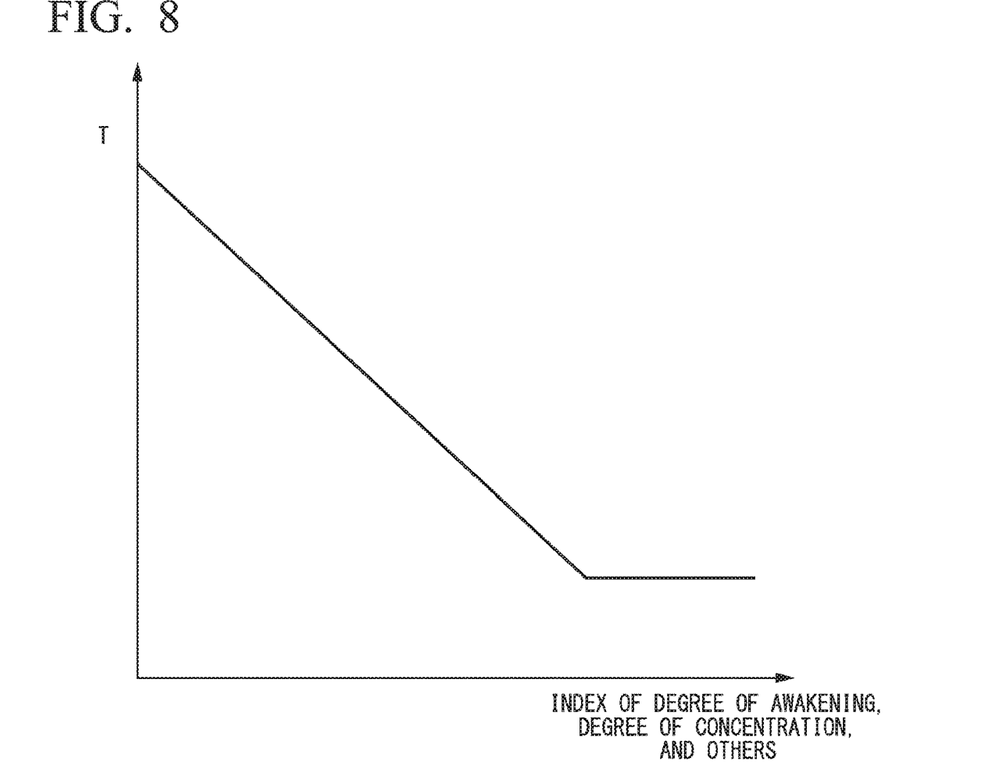
FIG. 8 is a diagram illustrating a view in which a predetermined period T is set on the basis of a state of a driver.

FIG. 8 is a diagram illustrating a view in which a predetermined period T is set on the basis of the state of a driver. The switching controller 124, for example, may set the predetermined period T to be shorter as an index of the degree of awakening, the degree of concentration, and the like (it is assumed that a higher value is a more preferable state) becomes higher. In this way, in a case in which a driver is in a desirable state prepared for manual driving, the control gain quickly approaches that of a normal time, and the responsiveness can be improved.

After switching over to manual driving, the switching controller 124 performs control such that the operation amount of the driving operator 80 is directly provided for the traveling driving force output device 200, the brake device 210, and the steering device 220. Thereafter, manual driving in which the traveling driving force output device 200, the brake device 210, and the steering device 220 operate on the basis of the operation amount of the driving operator 80 without the automated driving controller 100 being involved in the control process (it may perform relay of signals) is executed.

In addition, in a case in which a reason for the action plan generator 123 to start a handover event, particularly, is a specific reason requiring an emergency operation, the switching controller 124 may not perform the gain-reduction driving. Here, a specific reason for this, for example, may be a sudden interruption by another vehicle at a short distance away on the side in front, a malfunction in the electric motor of the steering device 220, or the like.

Figure 9:
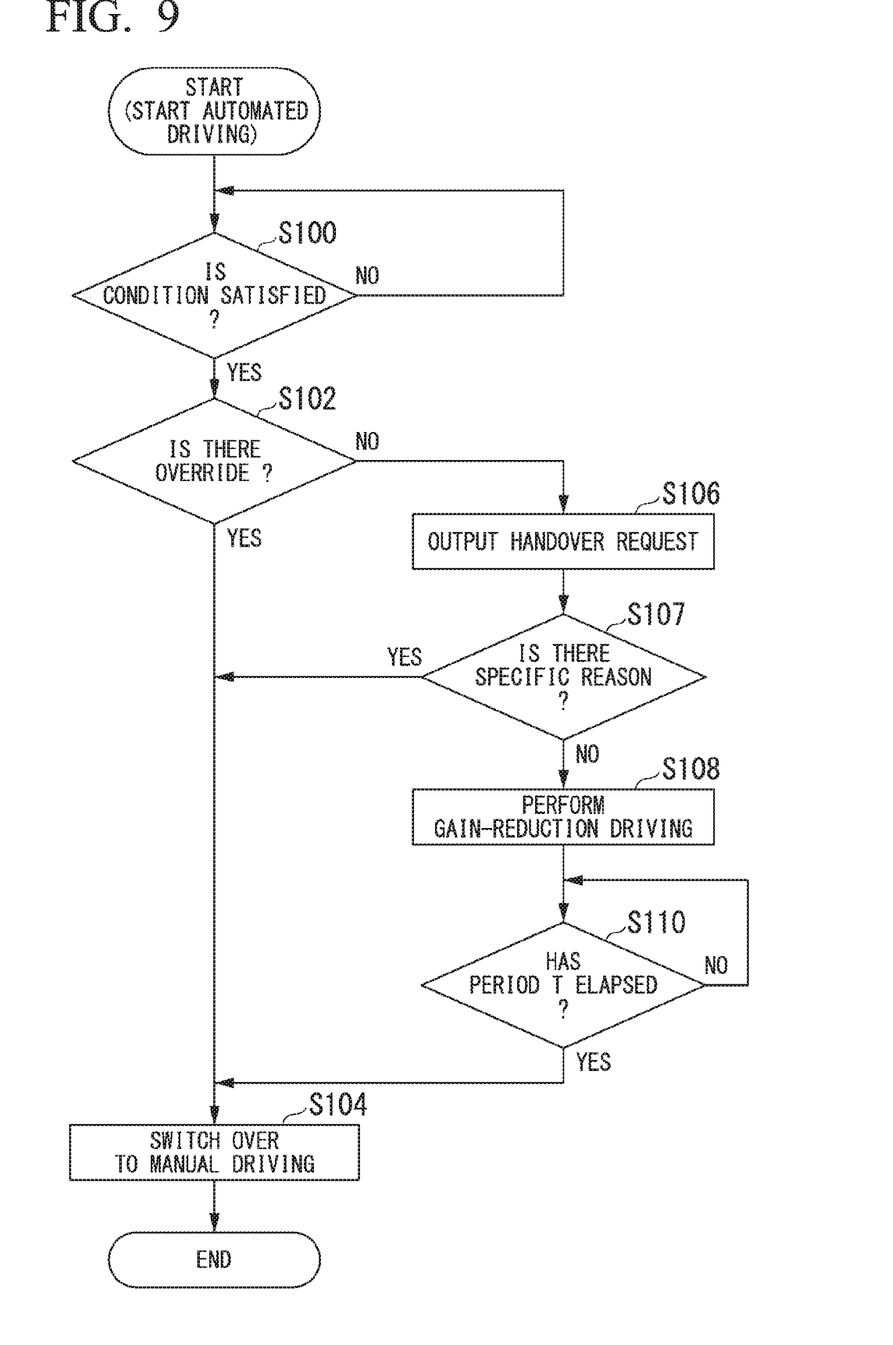
FIG. 9 is a flowchart illustrating another example of a process executed by the automated driving controller.

FIG. 9 is a flowchart illustrating another example of a process executed by the automated driving controller 100. In this drawing, the same step numbers are assigned to steps which are the same as those illustrated in FIG. 4, and description thereof will be omitted.

When a handover request is output to the HMI 30 (Step S106), the switching controller 124 determines whether or not a handover event has started in accordance with a specific reason (Step S107). In a case in which a handover event has started in accordance with a specific reason, the switching controller 124 quickly switches over to manual driving without performing the gain-reduction driving (Step S104) and performs control of the driving device such that manual driving is performed with a control gain of a normal time. On the other hand, in a case in which a handover event has not started in accordance with a specific reason, the switching controller 124 performs gain-reduction driving during a predetermined time T and switches over to manual driving after elapse of the predetermined time T (Steps S108, S110, and S104).

According to the vehicle control system, the vehicle control method, and the vehicle control program according to the embodiment described above, when switching from automated driving to manual driving is performed, occurrence of inappropriate behavior in the vehicle according to an excessive operation can be inhibited.

As above, although a form of the present invention has been described using an embodiment, the present invention is not limited to such an embodiment at all, and various modifications and substitutions can be applied within a range not departing from the concept of the present invention.

What is claim is:

1. A vehicle control system comprising:
   a driving operator on which an operation used for manual driving is performed by a vehicle occupant;
   an output device configured to output information; and
   a processor configured to:
   execute automated driving automatically controlling at least one of acceleration/deceleration and steering of a vehicle; and cause the output device to output request information for requesting an operation on the driving operator when automated driving ends and is switched to manual driving and sets a control gain for the operation performed on the driving operator to be lower in at least a predetermined period after causing the output device to output the request information than in a period other than the predetermined period, wherein the processor is further configured to set the control gain in the predetermined period to be the same as the control gain in a period other than the predetermined period when the automated driving ends according to a specific reason according to a situation of outside of the vehicle and is switched to the manual driving.

2. The vehicle control system according to claim 1, wherein the processor is configured to change an output form of the request information from the output device based on a cause that is a reason for ending automated driving and switching over to the manual driving and change a degree of lowering the control gain in the predetermined period based on the cause or the output form of the request information.

3. The vehicle control system according to claim 1, wherein the processor is further configured to, after causing the output device to output the request information, gradually increase the control gain for the operation performed on the driving operator in accordance with elapse of time.

4. The vehicle control system according to claim 1, wherein the processor is further configured to detect a state of a vehicle occupant,
wherein the processor is configured to set the predetermined period to be variable based on the state of the vehicle occupant.

5. The vehicle control system according to claim 1, wherein the processor is further configured to decreases the control amount corresponding to an operation on the driving operator by decreasing the control gain in the predetermined period, and
wherein a part or all of devices of control targets of the vehicle control system operate based on the basis of the control amount decreased by the processor.

6. A vehicle control system comprising:
a driving operator on which an operation used for manual driving is performed by a vehicle occupant;
an output device configured to output information; and
a processor configured to:
execute automated driving automatically controlling at least one of acceleration/deceleration and steering of a vehicle; and
cause the output device to output request information for requesting an operation on the driving operator when automated driving ends and is switched to manual driving and sets a control gain for the operation performed on the driving operator to be lower in at least a predetermined period after causing the output device to output the request information than in a period other than the predetermined period,
wherein the processor is further configured to, in the predetermined period, set the control gain in a case in which an operation amount on the driving operator is equal to or smaller than a predetermined operation amount to be lower than a control gain in a case in which the operation amount on the driving operator exceeds the predetermined operation amount.

7. A vehicle control system comprising:
a driving operator on which an operation used for manual driving is performed by a vehicle occupant;
an output device configured to output information; and
a processor configured to:
execute automated driving automatically controlling at least one of acceleration/deceleration and steering of a vehicle; and
cause the output device to output request information for requesting an operation on the driving operator when automated driving ends and is switched to manual driving and sets a control gain for the operation performed on the driving operator to be lower in at least a predetermined period after causing the output device to output the request information than in a period other than the predetermined period,
wherein the processor is further configured to set the control gain relating to braking in the predetermined period to be the same as a control gain relating to braking in a period other than the predetermined period.

8. A vehicle control method using a control computer of a vehicle including a driving operator on which an operation used for manual driving is performed by a vehicle occupant and an output device that outputs information, the vehicle control method comprising:
executing automated driving automatically controlling at least one of acceleration/deceleration and steering of the vehicle;
causing the output device to output request information for requesting an operation on the driving operator when the automated driving ends and is switched to the manual driving and setting a control gain for the operation performed on the driving operator to be lower in a predetermined period after causing the output device to output at least the request information than in a period other than the predetermined period,
wherein setting the control gain comprises setting the control gain in the predetermined period to be the same as the control gain in a period other than the predetermined period when the automated driving ends according to a specific reason according to a situation of outside of the vehicle and is switched to the manual driving.

9. A computer-readable non-transitory storage medium storing a vehicle control program, the vehicle control program causing a control processor of a vehicle including a driving operator on which an operation used for manual driving is performed by a vehicle occupant and an output device that outputs information to perform:
executing automated driving automatically controlling at least one of acceleration/deceleration and steering of the vehicle; and
causing the output device to output request information for requesting an operation on the driving operator when the automated driving ends and is switched to the manual driving and setting a control gain for the operation performed on the driving operator to be lower in at least a predetermined period after causing the output device to output the request information than in a period other than the predetermined period,
wherein setting the control gain comprises setting the control gain in the predetermined period to be the same as the control gain in a period other than the predetermined period when the automated driving ends according to a specific reason according to a situation of outside of the vehicle and is switched to the manual driving.

* * * * *